US012670280B2

(12) United States Patent
Wang et al.

(10) Patent No.: US 12,670,280 B2
(45) Date of Patent: Jun. 30, 2026

(54) EFFICIENT, FLEXIBLE, AND SECURE DYNAMIC DIGITAL CONTENT CREATION

(71) Applicant: Google LLC, Mountain View, CA (US)

(72) Inventors: Gang Wang, Frederick, MD (US); Wenchao Tong, San Jose, CA (US)

(73) Assignee: Google LLC, Mountain View, CA (US)

( * ) Notice: Subject to any disclaimer, the term of this patent is extended or adjusted under 35 U.S.C. 154(b) by 190 days.

(21) Appl. No.: 18/285,297

(22) PCT Filed: Dec. 12, 2022

(86) PCT No.: PCT/US2022/052519
§ 371 (c)(1),
(2) Date: Oct. 2, 2023

(87) PCT Pub. No.: WO2024/096893
PCT Pub. Date: May 10, 2024

(65) Prior Publication Data
US 2025/0077710 A1     Mar. 6, 2025

Related U.S. Application Data

(60) Provisional application No. 63/421,771, filed on Nov. 2, 2022.

(51) Int. Cl.
*G06F 21/62* (2013.01)
*G06F 21/53* (2013.01)
(Continued)

(52) U.S. Cl.
CPC .......... *G06F 21/6263* (2013.01); *G06F 21/53* (2013.01); *G06F 40/14* (2020.01); *G06F 40/143* (2020.01); *G06Q 30/0271* (2013.01)

(58) Field of Classification Search
CPC ...... G06F 21/6263; G06F 21/53; G06F 40/14; G06Q 30/0271
See application file for complete search history.

(56) References Cited

U.S. PATENT DOCUMENTS

| | | |
|---|---|---|
| 8,958,779 B2 | 2/2015 | Ramer et al. |
| 9,177,277 B2 | 11/2015 | Bahrami et al. |
| | (Continued) | |

FOREIGN PATENT DOCUMENTS

WO     WO 2007141020     12/2007

OTHER PUBLICATIONS

International Preliminary Report on Patentability in International Appln. No. PCT/US2022/052519, mailed on May 15, 2025, 6 pages.

(Continued)

*Primary Examiner* — Keith D Bloomquist
(74) *Attorney, Agent, or Firm* — Fish & Richardson P.C.

(57) ABSTRACT

Methods, systems, and apparatus, including computer programs encoded on a computer storage medium, for generating dynamic digital content in privacy preserving ways are described. In one aspect, a method includes receiving, by a trusted server and from multiple content platforms, digital component data for digital components. The server received, from each content platform, dynamic content selection logic for selecting discrete content elements for digital components of the content platform. The server selects, from digital components for which digital component data is stored in a digital component repository, candidate digital components based at least on user data included in a digital component request. For each candidate digital component, the server executes the dynamic content selection logic of the content platform that provided the digital component data for the candidate digital component, the executing resulting in selection of a particular layout and a particular subset of content elements for the digital component.

17 Claims, 3 Drawing Sheets

(51) Int. Cl.
   _G06F 40/14_     (2020.01)
   _G06F 40/143_    (2020.01)
   _G06Q 30/0251_   (2023.01)

(56)                 References Cited

U.S. PATENT DOCUMENTS

| | | | |
|---|---|---|---|
| 9,596,132 | B1 * | 3/2017 | Erdmann .............. H04L 47/781 |
| 10,334,075 | B2 | 6/2019 | Momchilov et al. |
| 10,888,786 | B2 | 1/2021 | Ellis et al. |
| 10,997,265 | B1 * | 5/2021 | Tsun ................. G06F 16/24553 |
| 10,999,201 | B2 | 5/2021 | Ashner et al. |
| 11,087,365 | B1 * | 8/2021 | Bradley ................. H04L 67/53 |
| 2018/0293375 | A1 | 10/2018 | Wang et al. |
| 2021/0064650 | A1 * | 3/2021 | McCarty ................. G10L 15/22 |

OTHER PUBLICATIONS

International Search Report and Written Opinion in International Appln. No. PCT/US2022/052519, mailed on Apr. 6, 2023, 9 pages.

* cited by examiner

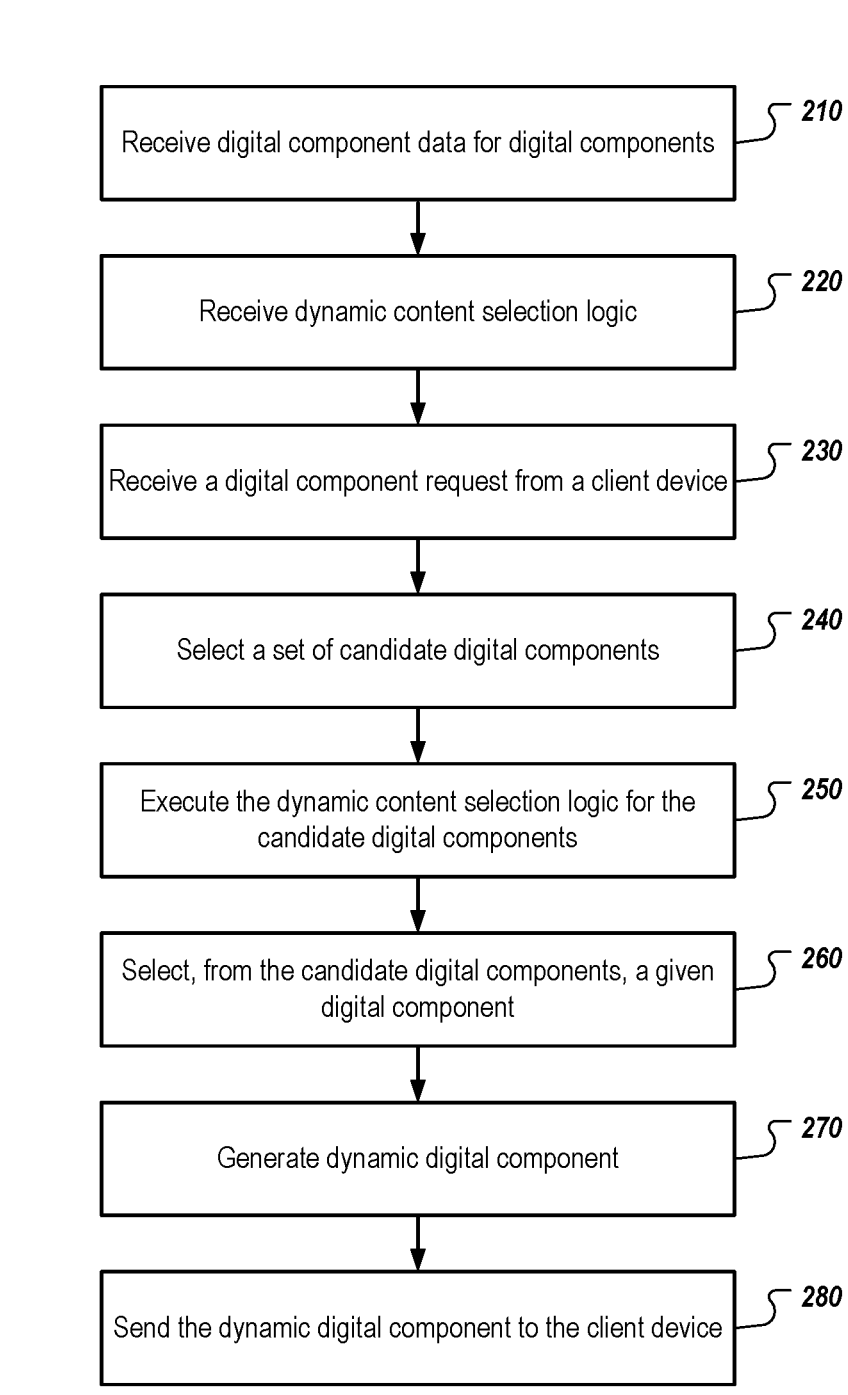

200

210 — Receive digital component data for digital components

220 — Receive dynamic content selection logic

230 — Receive a digital component request from a client device

240 — Select a set of candidate digital components

250 — Execute the dynamic content selection logic for the candidate digital components 260 — Select, from the candidate digital components, a given digital component 270 — Generate dynamic digital component 280 — Send the dynamic digital component to the client device

Processor

310

Memory

320

Storage
Device

330

340

350

Input/Output

External
Devices

360

EFFICIENT, FLEXIBLE, AND SECURE DYNAMIC DIGITAL CONTENT CREATION

CROSS-REFERENCE TO RELATED APPLICATION

This application is a National Stage Application under 35 U.S.C. § 371 and claims the benefit of International Application No. PCT/US2022/052519,filed Dec. 12, 2022, which claims priority to U.S. Application No. 63/421,771, filed on Nov. 2, 2022. The foregoing applications are incorporated herein by reference in their entirety for all purposes.

TECHNICAL FIELD

This specification is related to creating digital content using efficient, flexible, secure, and privacy preserving techniques.

BACKGROUND

Data security and user privacy are vital in systems and devices connected to public networks, such as the Internet. The enhancement of user privacy has led many developers to change the ways in which user data is handled. For example, some browsers are planning to deprecate the use of third-party cookies.

SUMMARY

In general, one innovative aspect of the subject matter described in this specification can be embodied in methods including the operations of receiving, by a trusted server and from multiple content platforms, digital component data for digital components, wherein the digital component data for each digital component comprises one or more layouts and a set of discrete content elements for creating dynamic versions of the digital component: receiving, by the trusted server and from each the multiple content platforms, dynamic content selection logic for selecting discrete content elements for digital components of the content platform based at least on information included in digital component requests: receiving, by the trusted server and from a client device of a user, a digital component request that requests a digital component for presentation at the client device, the digital component request comprising user data related to the user; selecting, by the trusted server and from a set of digital components for which digital component data is stored in a digital component repository, a set of candidate digital components based at least on the user data: executing, for each candidate digital component, the dynamic content selection logic of the content platform that provided the digital component data for the candidate digital component, the executing resulting in selection of a particular layout and a particular subset of the discrete content elements for the digital component: selecting, from among the set of candidate digital components, a given digital component to provide to the client device of the user: generating a dynamic digital component using the particular layout and the particular subset of the discrete content elements for the given digital component; and sending the dynamic digital component to the client device of the user. Other implementations of this aspect include corresponding apparatus, systems, and computer programs, configured to perform the aspects of the methods, encoded on computer storage devices.

These and other implementations can each optionally include one or more of the following features. In some aspects, generating the dynamic digital component includes generating a web bundle that includes a set of resources that enable a browser running on the client device of the user to display the dynamic digital component.

In some aspects, executing, for each candidate digital component, the dynamic content selection logic of the content platform that provided the digital component data for the candidate digital component includes executing the dynamic content selection logic of each content provider in a separate isolated environment. Each isolated environment can include an isolated virtual machine.

In some aspects, the dynamic content selection logic of at least one content platform is defined in a different programming language than the dynamic content selection logic of one or more other content platforms.

In some aspects, the dynamic content selection logic of at least one content platform includes a trained machine learning model that selects layouts and discrete content elements for digital components of the content platform based on input user data of digital component requests. The trained machine learning model is trained to select the layouts and discrete content elements to increase a likelihood of users corresponding to the user data interacting with dynamic digital components generated and provided to the users.

Some aspects include executing, for each candidate digital component, the selection factor logic of the content platform that provided the digital component data for the candidate digital component in an isolated environment to determine a selection factor for the candidate digital component. Selecting, from among the set of candidate digital components, the given digital component can include selecting the given digital component based on the selection factor for each candidate digital component.

Particular embodiments of the subject matter described in this specification can be implemented so as to realize one or more of the following advantages. Using a trusted server to select and generate dynamic content, e.g., digital components, enables such selection and generation to be performed based on sensitive user data without the data being leaked to other parties and enables personalization of the content even after third party cookies are deprecated and other privacy enhancements are implemented. Dynamic content can be generated by populating a content layout (e.g., a template) with one or more discrete content elements, which can be in the form of text, images, video, or other appropriate format. Similarly, the layout itself can be generated dynamically based on the same or similar signals used to generate the dynamic content. After the dynamic content is generated, the trusted server can provide all discrete content elements and any other required data of the content to the device of the user, e.g., in the form of a web bundle, so that an application running on the device can present the content without sending any other requests for any content element of the dynamic content. This further preserves user privacy by preventing content platforms that provide such content to learn that the content is being provided to that particular user or the user's device. For example, this obviates the need for the user's device to download a discrete content element for a digital component based on a Universal Resource Locator (URL) or Universal Resource Identifier (URI) provided to the device.

The logic (e.g., in the form of rules or machine learning models) for generating dynamic content for each content platform can be executed in an isolated environment, e.g., in a separate virtual machine, of the trusted server to prevent leakage of such confidential logic to other content platforms. This execution within the trusted server enables the use of such confidential logic in combination with sensitive user data without jeopardizing the confidentiality or security of the user data or the confidential logic.

The process for selecting discrete content elements of dynamic content and generating the dynamic content using the selected content elements can be bifurcated to enhance the efficiency at which the dynamic content is generated. For example, the trusted server can execute the logic of each of multiple content platforms to select a set of content elements for each of multiple candidate digital components that are candidates for selection as a digital component to be provided to a client device of a user. Rather than generate multiple digital components using their respective sets of content elements, the trusted server can perform a subsequent content generation process to generate a dynamic digital component for only the digital component selected to be provided to the client device. In addition, the templates and content elements for each digital component can be stored in a digital component repository with unique identifiers. Rather than send the content elements for each candidate digital component from the repository to the trusted server, the trusted server can user the identifiers for the content elements of the selected digital component to retrieve only those content elements, which reduces consumed bandwidth between the trusted server and the repository and the amount of computations performed by the trusted server and consumed memory of the trusted server for storing content elements for other candidates.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for selecting, generating, and providing a dynamic digital component for display at a client device in a privacy preserving manner.

Like reference numbers and designations in the various drawings indicate like elements.

DETAILED DESCRIPTION

In general, this document describes systems and techniques for selecting and distributing dynamic content, e.g., dynamic digital components, to client devices in ways that protect user privacy and confidential data of content platforms and/or digital component providers. Here, dynamic content is content that is generated by selecting a content layout and/or arranging discrete content elements, e.g., within a layout. In this way, the content is generated dynamically and differs between different presentations of the content. A trusted server can be configured to perform digital component selection processes that use sensitive user data so that the user data is not provided to any other entity. The trusted server can host and execute selection logic of various content platforms when selecting digital components based on user data in manners that ensure that no other entity can access the selection logic of the content platform. In this way, both the data of the users and the content platforms is kept secure.

In addition to the selection logic, the trusted server can host dynamic content selection logic for generating dynamic digital components using digital component layouts (e.g., templates) and a set of discrete content elements. Each layout can define, or include metadata that defines, the types of content elements that can be inserted or otherwise arranged in the layout and how the content elements are arranged. The content elements can be in the form of text, images, video, or other appropriate format.

A digital component repository can store, for each dynamic digital component, one or more digital component layouts and a set of content elements. If the digital component is selected for distribution to a client device for presentation to a user, the trusted server can generate a dynamic version of the digital component by populating the template with a subset of the content elements. The trusted server can execute the respective dynamic content selection logic to select the layout and/or content elements for a digital component of the content platform based on data included in a digital component request.

Figure 1:
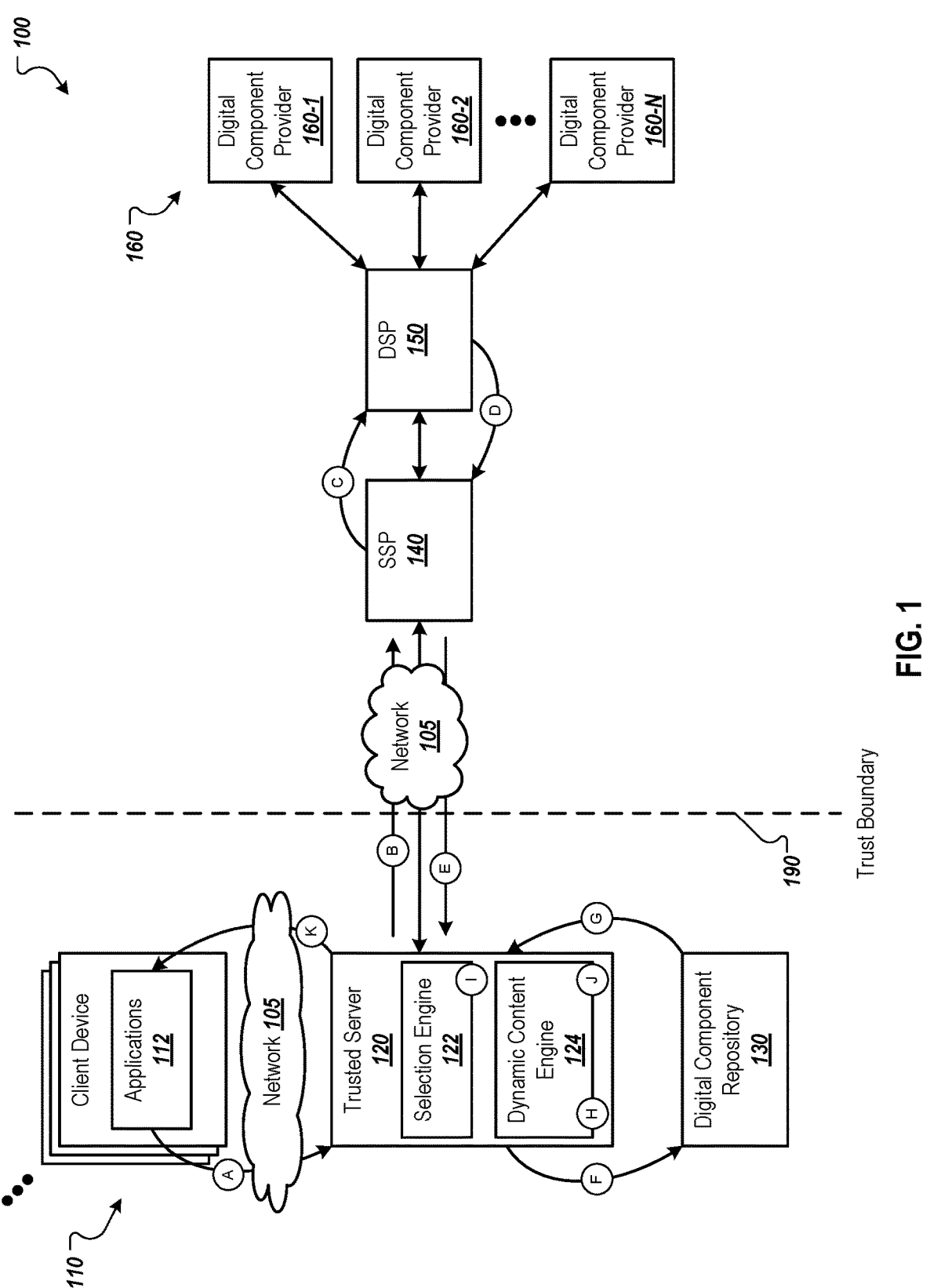
FIG. 1 is a block diagram of an example environment in which a trusted server distributes digital components to client devices in a privacy preserving manner.

FIG. 1 is a block diagram of an example environment 100 in which a trusted server 120 distributes digital components to client devices 110 in a privacy preserving manner. Although not shown in FIG. 1, the environment 100 includes a data communication network 105, such as a local area network (LAN), a wide area network (WAN), the Internet, a mobile network, or a combination thereof. The data communication network 105 connects client devices 110 to the trusted server 120 and connects the trusted server 120 to content platforms, such as supply side platforms (SSPs) 140 and/or demand side platforms (DSPs). The network 105 can also connect the various content platforms to one another and/or to digital component providers 160, e.g., to servers of the digital component providers 160.

A client device 110 is an electronic device that is capable of communicating over the network 105. Example client devices 110 include personal computers, server computers, mobile communication devices, e.g., smart phones and/or tablet computers, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming system, or a virtual reality system.

A client device 110 can include applications 112, such as web browsers and/or native applications, to facilitate the sending and receiving of data over the network 105. A native application is an application developed for a particular platform or a particular device (e.g., mobile devices having a particular operating system). Although operations may be described as being performed by the client device 110, such operations may be performed by an application 112 running on the client device 110.

The applications 112 can present electronic resources, e.g., web pages, application pages, or other application content, to a user of the client device 110. The electronic resources can include digital component slots for presenting digital components with the content of the electronic resources. A digital component slot is an area of an electronic resource (e.g., web page or application page) for displaying a digital component. A digital component slot can also refer to a portion of an audio and/or video stream (which is another example of an electronic resource) for playing a digital component.

An electronic resource is also referred to herein as a resource for brevity. For the purposes of this document, a resource can refer to a web page, application page, application content presented by a native application, electronic document, audio stream, video stream, or other appropriate type of electronic resource with which a digital component can be presented.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource that includes a digital component slot, the application 112 can generate a digital component request that requests a digital component for presentation in the digital component slot. In some implementations, the digital component slot and/or the resource can include code (e.g., scripts) that cause the application 112 to request a digital component from the trusted server 120.

A digital component request sent by a client device 110 can include sensitive user data related to a user of the client device 110 and/or non-sensitive data. The sensitive user data can include, for example, data identifying user groups that include the user as a member. The user groups can include interest-based groups. Each interest-based group can include a topic of interest and a set of members identified (e.g., determined or predicted) to be interested in the topic. The user groups can also include, for example, groups of users that performed particular actions at electronic resources (e.g., websites or native applications) of publishers. For example, a user group can include users that visited a website, users that requested more information about an item, interacted with (e.g., selected) a particular digital component and/or added an item to a virtual cart to potentially acquire the item. The user data for a user can also include user profile data and/or attributes of the user.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A digital component request can also include contextual data, which is generally considered non-sensitive. The contextual data can describe the environment in which a selected digital component will be presented. The contextual data can include, for example, coarse location information indicating a general location of the client device 110 that sent the digital component request, a resource (e.g., website or native application) with which the selected digital component will be presented, a spoken language setting of the application 112 or client device 110, the number of digital component slots in which digital components will be presented with the resource, the types of digital component slots, and other appropriate contextual information.

The trusted server 120 can be implemented using one or more server computers (or other appropriate computing devices), that may be distributed across multiple locations. In general, the trusted server 120 receives requests for digital components from client devices 110, selects digital components based on data included in the requests, and sends the selected digital components to the client devices 110.

As the trusted server 120 receives sensitive user data, the trusted server 120 can be operated and maintained by an independent trusted party, e.g., a party that is different from the users of the client devices, the parties that operate the SSPs 140 and DSPs 150, and the digital component providers 160. For example, the trusted server 120 can be operated by an industry group or a governmental group.

As described in more detail below; the trusted server 120 can select a digital component from a set of digital components stored (or for which digital component data is stored) in a digital component repository 130 and/or a set of digital components received from an SSP 140. The digital component repository 130 stores digital components received from content platforms (e.g., from SSPs 140 and/or DSPs 150) and additional data (e.g., metadata) for each digital component. The metadata for a digital component can include, for example, distribution criteria that defines the situations in which the digital component is eligible to be provided to a client device 110 in response to a digital component request received from the client device 110 and/or a selection factor that indicates an amount that will be provided to the publisher if the digital component is displayed with a resource of the publisher and/or interacted with by a user when presented. For example, the distribution criteria for a digital component can include location information indicating which geographic locations that digital component is eligible to be presented, user group membership data identifying user groups to which the digital component is eligible to be presented, resource data identifying resources with which the electronic resource is eligible to be presented, and/or other appropriate distribution criteria. The distribution criteria can also include negative criteria, e.g., criteria indicating situations in which the digital component is not eligible (e.g., with particular resources or in particular locations). Other data that can be used to select a digital component can also be stored in the digital component repository with a reference (e.g., a link or as metadata) to its digital component.

The digital component repository 130 can store static and/or dynamic digital components. A static digital component is a digital component that is presented the same for each presentation of the digital component. A dynamic digital component is generated dynamically by the trusted server 120 can differ across multiple presentations of the digital component. For static digital components, the digital component repository 130 can store one or more files that represent the static digital component. These files can include images, text, HyperText Markup Language (HTML) and/or Hypertext Transfer Protocol (HTTP) data and/or files used by an application 112 to render the digital component, and/or other appropriate data that can be used to render the digital component.

For dynamic digital components, the digital component repository 130 can store one or more digital component layouts and a set of discrete content elements that can be selected and used to generate dynamic versions of the digital component. Each layout can define, or include metadata that defines, the types of content elements that can be inserted or otherwise arranged in the layout and how the content elements are arranged. The layout can define the size of the digital component (e.g., the width and length of the digital component), locations of various types of content elements within the layout, the size and shape of each content element, and/or other perceivable features of the digital component. For example, a layout can be in the form of a template that includes placeholders for particular types of content elements. The content elements can be in the form of text, images, video, or other appropriate format.

In some implementations, the digital component repository 130 includes a database or table that maps each digital component to its layout(s), content elements, and dynamic content selection logic. For example, the trusted server can maintain a table or database with a row for each digital component and the cells of the row can include unique identifiers for the layout(s), content elements, and logic. In this way, the trusted server 120 can retrieve the appropriate layout, content elements, and logic for each digital component from the digital component repository 130.

The trusted server 120 can generate a dynamic digital component by selecting content elements for the digital component and populating the layout with the selected content elements, as described in more detail below. For both static and dynamic digital components, the trusted server 120 can send all of the data and/or files that an application 112 will need to render the digital component at the client device 110. In this way, the client device 110 does not request any content element (e.g., an image for the digital component) from a content platform or other device using a URL sent to the client device 110. This prevents the content platforms and/or other parties from correlating such content elements and/or their corresponding digital components with the user, which enhances user privacy. In some implementations, the trusted server 120 sends the data and/or files in the form of a web bundle. A web bundle is a file format that includes HTTP resources in a single file.

An SSP 140 is a technology platform implemented in hardware and/or software that automates the process of obtaining digital components for the resources. Publishers of resources can use an SSP 140 to manage the process of obtaining digital components for digital component slots of its resources. Each publisher can have a corresponding SSP 140 or multiple SSPs 140. Some publishers may use the same SSP 140.

A DSP 150 is a technology platform implemented in hardware and/or software that automates the process of distributing digital components for presentation with the resources and/or applications. A DSP 150 can interact with multiple supply-side platforms SSPs on behalf of digital component providers 160 to provide digital components for presentation with the resources of multiple different publishers. Digital component providers 160 can create (or otherwise publish) digital components that are presented in digital component slots of publisher's resources.

In this example, user data does not cross a trust boundary 190 that separates the client device 110, the trusted server 120, and the digital component repository from the SSP 140, DSP 150, and digital component providers 160. In this way, no entity other than the client device 110 and the trusted server 120 receives the user data that is included in a digital component request. This preserves user privacy and data security, especially when compared to techniques that employ third party cookies to send user data across the Internet.

An example process for selecting and providing a digital component for presentation at a client device 110 is illustrated in stages A-I, which illustrate a flow of data between the components of the environment 100.

In stage A, the application 112 sends a digital component request to the trusted server 120. As described above, the application 112 can send a digital component request to request a digital component for presentation in a digital component slot of a resource being presented by the application 112. The digital component request can include user data and contextual data.

In stage B, the trusted server 120 sends a context-based digital component request to an SSP 140. The context-based digital component request can include the contextual data of the digital component request received from the application 112. However, the context-based digital component request does not include any of the user data. The trusted server 120 can temporarily store the user data while waiting for a response from the SSP 140. The trusted server 120 can send the context-based digital component request to an SSP 140 for the publisher of the resource being presented by the application 112.

In stage C, the SSP 140 forwards the context-based digital component request to one or more DSPs 150. In stage D, each DSP 150 sends, to the SSP 140, one or more selection factors for one or more digital components, e.g., digital components stored in the digital component repository 130. For example, the DSP 150 can select a digital component based on the contextual data of the context-based request and determine a selection factor for the digital component based on the contextual data. The DSP 150 can also provide a digital component and selection factor, e.g., a digital component that is not stored in the digital component repository 130. Each DSP 150 can send a selection factor with data indicating the digital component to which the selection factor applies. The digital components for which selection factors are provided by the DSPs 150 can be referred to as context-based digital components.

In stage E, the SSP 140 sends the digital components and/or selection factors to the trusted server 120. In some implementations, the SSP 140 can filter digital components and/or selection factors prior to sending the digital components and/or selection values to the trusted server 120. For example, the SSP 140 can filter digital components and/or selection factors based on publisher controls specified by the publisher of the resource being presented by the application 112. In a particular example, a publisher of a web page about a particular event may define, as a publisher control, that digital components related to another event may not be presented with this web page. The SSP 140 can filter based on rules or other data provided by the publisher.

In stage F, the trusted server 120 queries the digital component repository 130 for a set of user-based digital components that are selected based on the user data of the digital component request. For example, the trusted server 120 can submit a query that defines, as conditions of the query, the user data of the digital component request. In some implementations, the query can also include context-based conditions. For example, a query can request retrieval of digital components that include, as distribution criteria, a particular user group and/or a particular geographic location. Although shown after stages B-E, the trusted server 120 can query the digital component repository in parallel with these stages to reduce the latency in selecting and providing a digital component to the application 112.

In stage G, the trusted server 120 receives data identifying a set of user-based digital components from the digital component repository 130 and a selection factor for each user-based digital components. The set of user-based digital components can include those having distribution criteria that matches the conditions of the query. These user-based digital components and the context-based digital components can also be referred to as candidate digital components as they are candidates for selection by the trusted server 120 for distribution to the client device 110 from which the digital component request was received.

In stage H, a dynamic content engine 124 selects a layout and/or a set of discrete content elements for each candidate digital component. In some implementations, the dynamic content engine 124 selects the layout and/or content elements for a candidate digital component based on the user data and/or the contextual data of the digital component request. For example, the dynamic content engine 124 can select the layout and/or content elements in a way that increases or maximizes the likelihood that the user will interact with (e.g., click or select) the digital component if the digital component is presented to the user with the resource for which the digital component request was received.

The trusted server 120 can host and execute dynamic content selection logic for selecting layouts and discrete content elements for digital components. Each content platform (e.g., SSP 140 and/or DSP 150) can generate custom dynamic content selection logic for generating dynamic versions of its digital components by selecting layouts and/or content elements based on digital component request data (e.g., user data and/or contextual data).

As the dynamic content selection logic of a content platform may be highly confidential, the trusted server 120 can execute the dynamic content selection logic for each content platform is an isolated environment. For example, the trusted server 120 can deploy a virtual machine for each content platform and execute the dynamic content selection logic of each content platform in its own separate and isolated virtual machine. In this way, no content platform can learn anything about the confidential logic of other content platforms. The trusted server 120 can deploy each virtual machine or other isolated environment in a sandbox environment. In this way, the trusted server 120 can control the data that is provided to each virtual machine or sent from each virtual machine, which can prevent logic of a content platform from sending sensitive data, e.g., user data, outside of the trusted server 120. This further enhances user privacy in the generation of dynamic digital content by preventing leakage if sensitive user data from the trusted server 120.

The trusted server 120 can enable content platforms to provide custom dynamic content selection logic in different forms, e.g., using different programming languages, machine learning models, rules, etc. For example, a first content platform can provide a machine learning model that is encoded in a first programming language and trained to select a layout and/or content elements for each of its digital components based on the digital component request data. A second content platform can provide a set of rules encoded in a second programming language different from the first programming language. The trusted server 120 can initiate virtual machines at the trusted server 120 (e.g., rather than on a cloud platform) and configure the virtual machines appropriately for each content platform.

After selecting the layout and content elements for each candidate digital component, the trusted server 120 can store the selections for each candidate digital component. For example, the trusted server 120 can store the information in a cache or other fast access memory.

In stage I, a selection engine 122 of the trusted server 120 selects a digital component to provide to the application 112 for presentation in the digital component slot. The selection engine 122 can select a digital component from the set of context-based digital components and the user-based digital components. The selection engine 122 can select the digital components from the candidate digital components based on the selection factor for each digital component and/or a predicted performance measure for each digital component. For example, the selection engine 122 can select the digital component having the highest selection factor or the highest product of its selection factor and predicted performance measure.

In stage J, the trusted server 120 generates a dynamic version of the selected digital component using the layout and content elements selected for the digital component. For example, the trusted server 120 can populate the layout with the content elements as defined by the layout or its metadata. The trusted server 120 can then package this dynamic digital component in a file, e.g., in a web bundle. In another example, the trusted server 120 can generate the web bundle with the layout and the selected content elements, along with data (e.g., instructions) that define how to render the dynamic digital component at the client device 110. In this example, the application 112 can use this data to generate the digital component and present the digital component to the user.

In stage K, the trusted server 120 provides the selected digital component (e.g., the web bundle or other file) to the application 112. The application 112 can then present the digital component with the resource being presented by the application 112.

FIG. 2 is a flow diagram of an example process 200 for selecting, generating, and providing a dynamic digital component for display at a client device in a privacy preserving manner. Operations of the process 200 can be performed by a trusted server, e.g., the trusted server 120 of FIG. 1. Operations of the process 200 can also be implemented as instructions stored on one or more computer readable media, which may be non-transitory, and execution of the instructions by one or more data processing apparatus can cause the one or more data processing apparatus to perform the operations of the process 200. For brevity, the process 200 is described in terms of being performed by a trusted server.

The trusted server receives, from multiple content platforms, digital component data for digital components (210). The digital component data for a digital component can include one or more layouts and a set of discrete content elements for creating dynamic versions of the digital component.

Each content platform can provide digital component data for digital components periodically or whenever the content platform determines to update the digital component data at the trusted server. For example, when a content platform generates new images or text for a digital component, or a new layout for a digital component, the content platform can provide, to the trusted server, the updated digital component data for that digital component.

The trusted server can store the digital component data for each digital component of each content platform in a digital component repository. In some implementations, the trusted server can store the digital component data for each content platform separately, e.g., in different storage devices or in isolated areas of secure data storage devices.

The trusted server receives, from each the multiple content platforms, dynamic content selection logic (220). As described above, the dynamic content selection logic is used to select discrete content elements for digital components of the content platform based at least on information included in digital component requests. For example, the dynamic content selection logic of a content platform can be configured (e.g., trained in the case of a machine learning model) to select a layout from multiple layouts for the digital component and discrete content elements from the set of discrete content elements for the digital component based on user data and/or contextual data of a digital component request.

Each content platform can customize its dynamic content selection logic to select a layout and/or content elements, and each content platform can select from many programming languages for use in generating the dynamic content selection logic. The trusted server can be configured to execute logic programmed in the many programming languages, e.g., in isolated virtual machines, as described above. In some implementations, a content platform can provide dynamic content selection logic for use with multiple digital components or digital component specific logic for each individual digital component.

The trusted server receives, from a client device of a user, a digital component request that requests a digital component for presentation at the client device (230). As described above, the digital component request can include user data related to the user and/or contextual data.

The trusted server selects, from a set of digital components for which digital component data is stored in a digital component repository, a set of candidate digital components based at least on the user data (240). The trusted server can also select the candidate digital components based on the contextual data. As described above, the trusted server can also obtain context-based digital components from content platforms.

The trusted server can select the candidate digital components based on distribution criteria for each digital component. For example, a digital component data for a digital component can include distribution criteria that indicates characteristics of users and/or contextual data for which the digital component is eligible (or not eligible) for presentation. In a particular example, the distribution criteria for a digital component can define that the digital component is eligible for presentation to members of a first user group but not to members of a second user group. In another example, the distribution criteria for a digital component can define that the digital component is eligible for presentation to members of a first user group when the member is viewing a particular resource. The distribution criteria can include any combination of user data, contextual data, and/or other appropriate types of data that can be used to condition environments and/or circumstances in which the digital component can be presented.

The trusted server executes, for each candidate digital component, the dynamic content selection logic of the content platform that provided the digital component data for the candidate digital component (250)). When the trusted server selects a digital component as a candidate, the trusted server can identify, e.g., in the digital component repository, the dynamic content selection logic mapped to the digital component. The trusted server can then execute the dynamic content selection logic for each candidate digital component, e.g., in an isolated environment. For example, as described above, the trusted server can initiate an isolated virtual machine for each content platform and execute the dynamic content selection logic for the content platform's digital component(s) in the virtual machine.

The dynamic content selection logic for each digital component is configured to output a layout and/or set of content elements for a dynamic version of the digital component based on information of the digital component request. For example, the dynamic content selection logic can be a trained machine learning model that is trained to output a layout from among the layouts available for the digital component and a subset of content elements of the set of content elements available for the digital component based on input data that includes user data and/or contextual data from a digital component request. Thus, execution of the dynamic content selection logic results in selection of a particular layout and a particular subset of the discrete content elements for the digital component.

The trusted server selects, from among the set of candidate digital components, a given digital component to provide to the client device of the user (260). As described above, the trusted server can select the given digital component based on a selection factor and/or predicted performance measure for each candidate digital component. In some implementations, the predicted performance measure can be based on the selected layout and/or content elements for each digital component. For example, the trusted server can use a trained machine learning model to predict the performance (e.g., interaction rate) for each candidate digital component based on the visual characteristics of the candidate digital components as constructed using the selected layout and/or content elements of each digital component, optionally also using visual characteristics of the resource with which the selected digital component will be presented.

The trusted server generates a dynamic digital component using the particular layout and the particular subset of the discrete content elements for the given digital component (270). For example, the trusted server can populate the particular template with the particular subset of the discrete content elements. The trusted server can also generate a web bundle that includes the resources for rendering the dynamic digital component.

The trusted server sends the dynamic digital component to the client device of the user (280). For example, the trusted server can send the web bundle that includes the digital component to the client device over a data communication network. In turn, the client device can present the digital component to the user of the client device.

Figure 3:
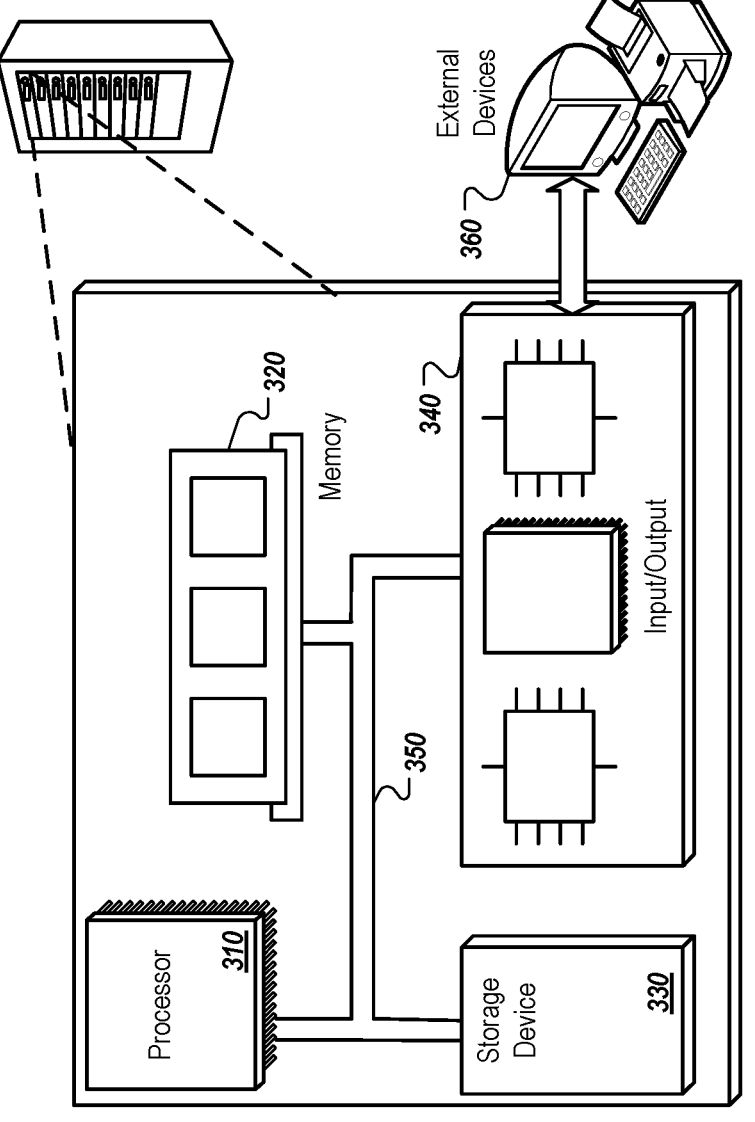
FIG. 3 is a block diagram of an example computer system.

FIG. 3 is a block diagram of an example computer system 300 that can be used to perform operations described above. The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In some implementations, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In some implementations, the memory 320 is a volatile memory unit. In another implementation, the memory 320 is a non-volatile memory unit.

The storage device 330 is capable of providing mass storage for the system 300. In some implementations, the storage device 330 is a computer-readable medium. In various different implementations, the storage device 330 can include, for example, a hard disk device, an optical disk device, a storage device that is shared over a network by multiple computing devices (e.g., a cloud storage device), or some other large capacity storage device.

The input/output device 340 provides input/output operations for the system 400. In some implementations, the input/output device 340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 360, e.g., keyboard, printer and display devices. Other implementations, however, can also be used, such as mobile computing devices, mobile communication devices, set-top box television client devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto-optical disks; and CD-ROM and DVD-ROM disks. The processor and the memory can be supplemented by, or incorporated in, special purpose logic circuitry.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine: in other cases, multiple engines can be installed and running on the same computer or computers.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

receiving, by a trusted server and from multiple content platforms, digital component data for digital components, wherein the digital component data for each digital component comprises one or more layouts and a set of discrete content elements for creating dynamic versions of the digital component;

receiving, by the trusted server and from each of the multiple content platforms, dynamic content selection logic for selecting discrete content elements for digital components of the content platform based at least on information included in digital component requests;

receiving, by the trusted server and from a client device of a user, a digital component request that requests a digital component for presentation at the client device, the digital component request comprising user data related to the user and context data describing an environment in which a returned digital component will be presented;

sending, by the trusted server, a context-based digital component request to one or more of the multiple content platforms, the context-based digital component request comprising the context data;

receiving, by the trusted server and from each content platform of the one or more content platforms, additional distribution parameters for context-based digital components selected based on the context data;

selecting, by the trusted server and from a set of digital components comprising (i) a plurality of digital components for which digital component data is stored in a digital component repository and (ii) the context-based digital components, a set of candidate digital components based at least on the user data;

executing, by the trusted server and for each candidate digital component, the dynamic content selection logic of the content platform that provided the digital component data for the candidate digital component, the executing resulting in selection of a particular layout and a particular subset of the discrete content elements for the candidate digital component, wherein the executing comprises executing the dynamic content selection logic of each content provider in a separate isolated environment;

selecting, from among the set of candidate digital components, a given digital component to provide to the client device of the user;

generating a dynamic digital component using the particular layout and the particular subset of the discrete content elements for the given digital component; and sending the dynamic digital component to the client device of the user.

2. The computer-implemented method of claim 1, wherein generating the dynamic digital component comprises generating a web bundle that includes a set of resources that enable a browser running on the client device of the user to display the dynamic digital component.

3. The computer-implemented method of claim 1, wherein each isolated environment comprises an isolated virtual machine.

4. The computer-implemented method of claim 1, wherein the dynamic content selection logic of at least one content platform is defined in a different programming language than the dynamic content selection logic of one or more other content platforms.

5. The computer-implemented method of claim 1, wherein the dynamic content selection logic of at least one content platform comprises a trained machine learning model that selects layouts and discrete content elements for digital components of the content platform based on input user data of digital component requests.

6. The computer-implemented method of claim 5, wherein the trained machine learning model is trained to select the layouts and discrete content elements to increase a likelihood of users corresponding to the user data interacting with dynamic digital components generated and provided to the users.

7. The computer implemented method of claim 1, further comprising executing, for each candidate digital component, the dynamic content selection logic of the content platform that provided the digital component data for the candidate digital component in the separate isolated environment to determine a selection factor for the candidate digital component, wherein selecting, from among the set of candidate digital components, the given digital component comprises selecting the given digital component based on the selection factor for each candidate digital component.

8. A system comprising:

one or more processors of a trusted server; and one or more storage devices storing instructions that, when executed by the one or more processors, cause the one or more processors to perform operations comprising:

receiving, by the trusted server and from multiple content platforms, digital component data for digital components, wherein the digital component data for each digital component comprises one or more layouts and a set of discrete content elements for creating dynamic versions of the digital component;

receiving, by the trusted server and from each of the multiple content platforms, dynamic content selection logic for selecting discrete content elements for digital components of the content platform based at least on information included in digital component requests;

receiving, by the trusted server and from a client device of a user, a digital component request that requests a digital component for presentation at the client device, the digital component request comprising user data related to the user and context data describing an environment in which a returned digital component will be presented;

sending, by the trusted server, a context-based digital component request to one or more of the multiple content platforms, the context-based digital component request comprising the context data;

receiving, by the trusted server and from each content platform of the one or more content platforms, additional distribution parameters for context-based digital components selected based on the context data;

selecting, by the trusted server and from a set of digital components comprising a plurality of digital components for which digital component data is stored in a digital component repository and (ii) the context-based digital components, a set of candidate digital components based at least on the user data;

executing, by the trusted server and for each candidate digital component, the dynamic content selection logic of the content platform that provided the digital component data for the candidate digital component, the executing resulting in selection of a particular layout and a particular subset of the discrete content elements for the candidate digital component, wherein the executing comprises executing the dynamic content selection logic of each content provider in a separate isolated environment;

selecting, from among the set of candidate digital components, a given digital component to provide to the client device of the user;

generating a dynamic digital component using the particular layout and the particular subset of the discrete content elements for the given digital component; and sending the dynamic digital component to the client device of the user.

9. The system of claim 8, wherein generating the dynamic digital component comprises generating a web bundle that includes a set of resources that enable a browser running on the client device of the user to display the dynamic digital component.

10. The system of claim 8, wherein each isolated environment comprises an isolated virtual machine.

11. The system of claim 8, wherein the dynamic content selection logic of at least one content platform is defined in a different programming language than the dynamic content selection logic of one or more other content platforms.

12. The system of claim 8, wherein the dynamic content selection logic of at least one content platform comprises a trained machine learning model that selects layouts and discrete content elements for digital components of the content platform based on input user data of digital component requests.

13. The system of claim 12, wherein the trained machine learning model is trained to select the layouts and discrete content elements to increase a likelihood of users corresponding to the user data interacting with dynamic digital components generated and provided to the users.

14. The system of claim 8, wherein the operations comprise executing, for each candidate digital component, the dynamic content selection logic of the content platform that provided the digital component data for the candidate digital component in the separate isolated environment to determine a selection factor for the candidate digital component, wherein selecting, from among the set of candidate digital components, the given digital component comprises selecting the given digital component based on the selection factor for each candidate digital component.

15. A non-transitory computer readable medium carrying instructions that, when executed by one or more processors of a trusted server, cause the one or more processors to perform operations comprising:

receiving, by the trusted server and from multiple content platforms, digital component data for digital components, wherein the digital component data for each digital component comprises one or more layouts and a set of discrete content elements for creating dynamic versions of the digital component;

receiving, by the trusted server and from each of the multiple content platforms, dynamic content selection logic for selecting discrete content elements for digital components of the content platform based at least on information included in digital component requests;

receiving, by the trusted server and from a client device of a user, a digital component request that requests a digital component for presentation at the client device, the digital component request comprising user data related to the user and context data describing an environment in which a returned digital component will be presented;

sending, by the trusted server, a context-based digital component request to one or more of the multiple content platforms, the context-based digital component request comprising the context data;

receiving, by the trusted server and from each content platform of the one or more content platforms, additional distribution parameters for context-based digital components selected based on the context data;

selecting, by the trusted server and from a set of digital components comprising (i) a plurality of digital components for which digital component data is stored in a digital component repository and (ii) the context-based digital components, a set of candidate digital components based at least on the user data;

executing, by the trusted server and for each candidate digital component, the dynamic content selection logic of the content platform that provided the digital component data for the candidate digital component, the executing resulting in selection of a particular layout and a particular subset of the discrete content elements for the candidate digital component, wherein the executing comprises executing the dynamic content selection logic of each content provider in a separate isolated environment;

selecting, from among the set of candidate digital components, a given digital component to provide to the client device of the user;

generating a dynamic digital component using the particular layout and the particular subset of the discrete content elements for the given digital component; and sending the dynamic digital component to the client device of the user.

16. The non-transitory computer readable medium of claim 15, wherein generating the dynamic digital component comprises generating a web bundle that includes a set of resources that enable a browser running on the client device of the user to display the dynamic digital component.

17. The non-transitory computer readable medium of claim 15, wherein each isolated environment comprises an isolated virtual machine.

\*    \*    \*    \*    \*